United States Patent
Gilani et al.

(10) Patent No.: US 10,530,603 B2
(45) Date of Patent: Jan. 7, 2020

(54) INTELLIGENT MULTI-MODAL IOT GATEWAY

(71) Applicant: Smartiply, Inc., Basking Ridge, NJ (US)

(72) Inventors: Arsalan A. Gilani, Teaneck, NJ (US); Christopher Coble, State College, PA (US); Raghuram Kaushik Pillalamarri, Basking Ridge, NJ (US); Shunge Li, Peachtree Corners, GA (US); William J. Heilig, Denville, NJ (US); Junshan Zhang, Tempe, AZ (US); Mung Chiang, Carmel, IN (US)

(73) Assignee: Smartiply, Inc., Basking Ridge, NJ (US)

( * ) Notice: Subject to any disclaimer, the term of this patent is extended or adjusted under 35 U.S.C. 154(b) by 46 days.

(21) Appl. No.: 15/863,923

(22) Filed: Jan. 6, 2018

(65) Prior Publication Data

US 2018/0198641 A1     Jul. 12, 2018

Related U.S. Application Data

(60) Provisional application No. 62/445,129, filed on Jan. 11, 2017.

(51) Int. Cl.
*H04L 12/50* (2006.01)
*H04L 12/28* (2006.01)
(Continued)

(52) U.S. Cl.
CPC ......... *H04L 12/2867* (2013.01); *G06N 20/00* (2019.01); *G08B 25/004* (2013.01);
(Continued)

(58) Field of Classification Search
CPC ..................................................... H04L 12/50
(Continued)

(56) References Cited

U.S. PATENT DOCUMENTS 8,843,178 B1    9/2014  Wong
9,473,987 B1   10/2016  Hicks
(Continued)

OTHER PUBLICATIONS

International Search Report and Written Opinion received in corresponding Patent Cooperation Treaty Application No. PCT/US18/012723, dated Mar. 29, 2018, 14 pages.
(Continued)

*Primary Examiner* — Dang T Ton
(74) *Attorney, Agent, or Firm* — Wei Wei Jeang; Grable Martin Fulton PLLC

(57) ABSTRACT

A fog network gateway includes at least one wireless communication interface, at least one cellular communication interface, and at least one wireline communication interface. The fog network gateway further includes connectivity logic configured to provide connection between a remote device and at least one local device via at least one of the wireless, cellular, and wireline communication interfaces, fog networking logic configured to form a fog network with the at least one local device for transmitting data thereto, and bandwidth aggregation logic configured to aggregate available bandwidth from at least two of the wireless, cellular, and wireline communication interfaces to ensure adequate bandwidth for data transmission between the remote device and the at least one local device. The fog network gateway further includes artificial intelligence logic configured to analyze data received from the at least one local device via the wireless, cellular, and wireline communication interfaces, and take appropriate action in response to the analysis.

25 Claims, 9 Drawing Sheets

(51) Int. Cl.

| | |
|---|---|
| *H04L 12/66* | (2006.01) |
| *H04L 12/24* | (2006.01) |
| *G08B 25/00* | (2006.01) |
| *H04L 29/06* | (2006.01) |
| *H04K 3/00* | (2006.01) |
| *G06N 20/00* | (2019.01) |
| *H04L 12/26* | (2006.01) |
| *H04L 12/46* | (2006.01) |
| *G08B 25/08* | (2006.01) |
| *H04W 40/34* | (2009.01) |
| *H04L 12/801* | (2013.01) |

(52) U.S. Cl.
CPC ........... *G08B 25/006* (2013.01); *G08B 25/08* (2013.01); *H04K 3/20* (2013.01); *H04L 12/4625* (2013.01); *H04L 12/66* (2013.01); *H04L 41/0668* (2013.01); *H04L 41/16* (2013.01); *H04L 43/0811* (2013.01); *H04L 63/1425* (2013.01); *H04L 41/0896* (2013.01); *H04L 47/14* (2013.01); *H04L 63/302* (2013.01); *H04W 40/34* (2013.01)

(58) Field of Classification Search
USPC ......................................................... 370/507
See application file for complete search history.

(56) References Cited

U.S. PATENT DOCUMENTS

| | | |
|---|---|---|
| 2007/0013785 A1 | 1/2007 | Kinoshita et al. |
| 2009/0207013 A1 | 8/2009 | Ayed |
| 2010/0231714 A1 | 9/2010 | Flores et al. |
| 2011/0130112 A1 | 6/2011 | Saigh et al. |
| 2012/0087257 A1 | 4/2012 | Larsson et al. |
| 2013/0237234 A1 | 9/2013 | Jiao et al. |
| 2014/0003262 A1 | 1/2014 | He et al. |
| 2014/0241265 A1 | 8/2014 | Pragada et al. |
| 2014/0341109 A1* | 11/2014 | Cartmell ............... H04L 45/308 370/328 |
| 2015/0117409 A1 | 4/2015 | Ghai |
| 2015/0181460 A1 | 6/2015 | Subramanian et al. |
| 2015/0334724 A1 | 11/2015 | Faccin et al. |
| 2015/0349881 A1 | 12/2015 | Byers |
| 2015/0358924 A1 | 12/2015 | Papasakellariou |
| 2016/0057809 A1 | 2/2016 | Gallagher et al. |
| 2016/0105305 A1 | 4/2016 | Pignataro et al. |
| 2016/0182639 A1 | 6/2016 | Hong et al. |
| 2016/0300227 A1 | 10/2016 | Subhedar et al. |
| 2016/0357524 A1 | 12/2016 | Maluf et al. |

OTHER PUBLICATIONS

International Search Report and Written Opinion received in corresponding Patent Cooperation Treaty Application No. PCT/US17/018254, dated May 5, 2017, 11 pages.

\* cited by examiner

INTELLIGENT MULTI-MODAL IOT GATEWAY

RELATED APPLICATIONS

This non-provisional patent application claims the benefit of U.S. Provisional Patent Application Ser. No. 62/445,129 filed on Jan. 11, 2017, which is incorporated herein by reference.

BACKGROUND

We all need bandwidth to stay connected, and there are always hungry devices and applications that demand more and more throughput. With the smartphone revolution and the availability of a plethora of mobile apps, there has been an exponential increase in bandwidth consumption globally. Video applications have accounted for 50% of data consumption, and are expected to grow to 70% by the year 2018. The emergence of IoT (Internet of Things) and connected devices is expected to put additional strain on the available broadband networks, likely resulting in poor user experience due to insufficient bandwidth. Because network upgrades are costly and often time consuming, demand will continue to stay ahead of network capacity enhancements being made by network service providers and operators.

The adoption of Industrial IoT applications has resulted in the creation of innovative services across all industrial sectors that improve efficiencies, cut costs, and drive new revenue streams. However, with bandwidth limitations either due to congestion or due to inadequate network infrastructure, enterprises are often not able to fulfill their service level agreements. Video surveillance companies, for example, face interruptions or latency in their live video streaming of monitored sites due to insufficient or unreliable bandwidth.

BRIEF DESCRIPTION OF THE DRAWINGS

References will be made to the accompanying drawing figures, in which like reference numerals are used to refer to like elements.

DETAILED DESCRIPTION

In many instances, there are multiple paths of data bandwidth available at many locations. However, conventional devices and applications can only actively utilize one data bandwidth at any point in time. There are existing solutions that offer primary and backup connectivity in the event of failure of the primary network. However, switching between two networks may cause latency that may not be acceptable in certain situations, such a live video monitoring scenario where continuous video streaming in real time is imperative.

The intelligent multi-modal IoT gateway concept described herein provides solutions to address the bandwidth issue by having the capability to connect to a variety of communication resources simultaneously. The intelligent multi-modal IoT gateway enables resource sharing across available networks and aggregates the available bandwidth to minimize or eliminate data interruptions and latency. The intelligent multi-modal IoT gateway has the ability to automatically discover nearby devices and sensors, connect to them, via wired or unwired communication channels, and uses a variety of connection technologies.

The intelligent multi-modal IoT gateway 10 described herein is designed to solve for difficult problems and challenges faced by IoT deployment, such as availability (insufficient bandwidth, and network and cloud outages), performance (cloud latency and delayed action), security (data transit risks and data loss), and affordability (initial costs and recurring costs, and stranded investments in legacy infrastructure). The intelligent multi-modal IoT gateway 10 enables high availability (combine multiple network, provide network diversity), better performance (local analytics and decision making, and reducing cloud dependency), tighter security (multi-channel encrypted data delivery, and data stored locally), and lower total cost of ownership (multi-faceted and extendible device to support multiple interfaces, and seamless integration into legacy infrastructure).

Figure 1:
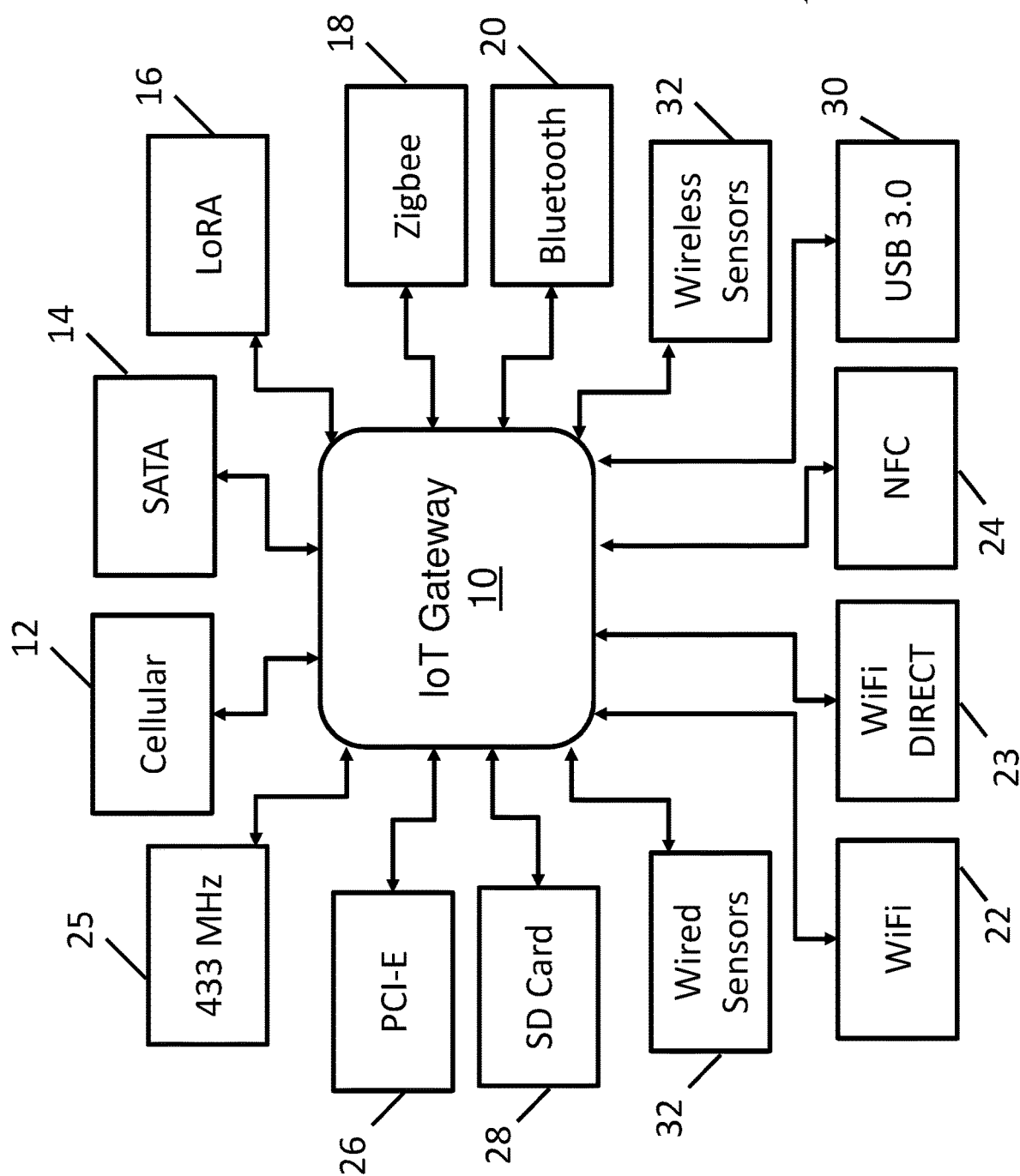
FIG. 1 is a greatly simplified block diagram of an exemplary intelligent multi-modal IoT gateway having connectivity capability to a wide variety of wired and wireless networks, devices, and resources, according to the teachings of the present disclosure.

Referring to FIG. 1, the intelligent multi-modal IoT gateway 10 has connectivity to a variety of networks, connections, and resources, including, for example, cellular network 12, SATA 14, LoRA 16, Zigbee 18, Bluetooth 20, WiFi 22, WiFi Direct 23, NFC 24, 433 MHz 25, PCI-Express 26, SD Card 28, USB 30, and wired and wireless sensors 32 and 34. the intelligent multi-modal IoT gateway 10 achieves robust and boosted connectivity using either built-in modules or pluggable hardware modules, or both, to support heterogeneous technologies. The active and simultaneous utilization of multiple networks, connectivity, and resources provides reliability such that failure or poor performance of any one of the available networks would not impact any transaction, such as live video streaming/monitoring, so that the system is naturally and automatically fault tolerant.

Figure 2:
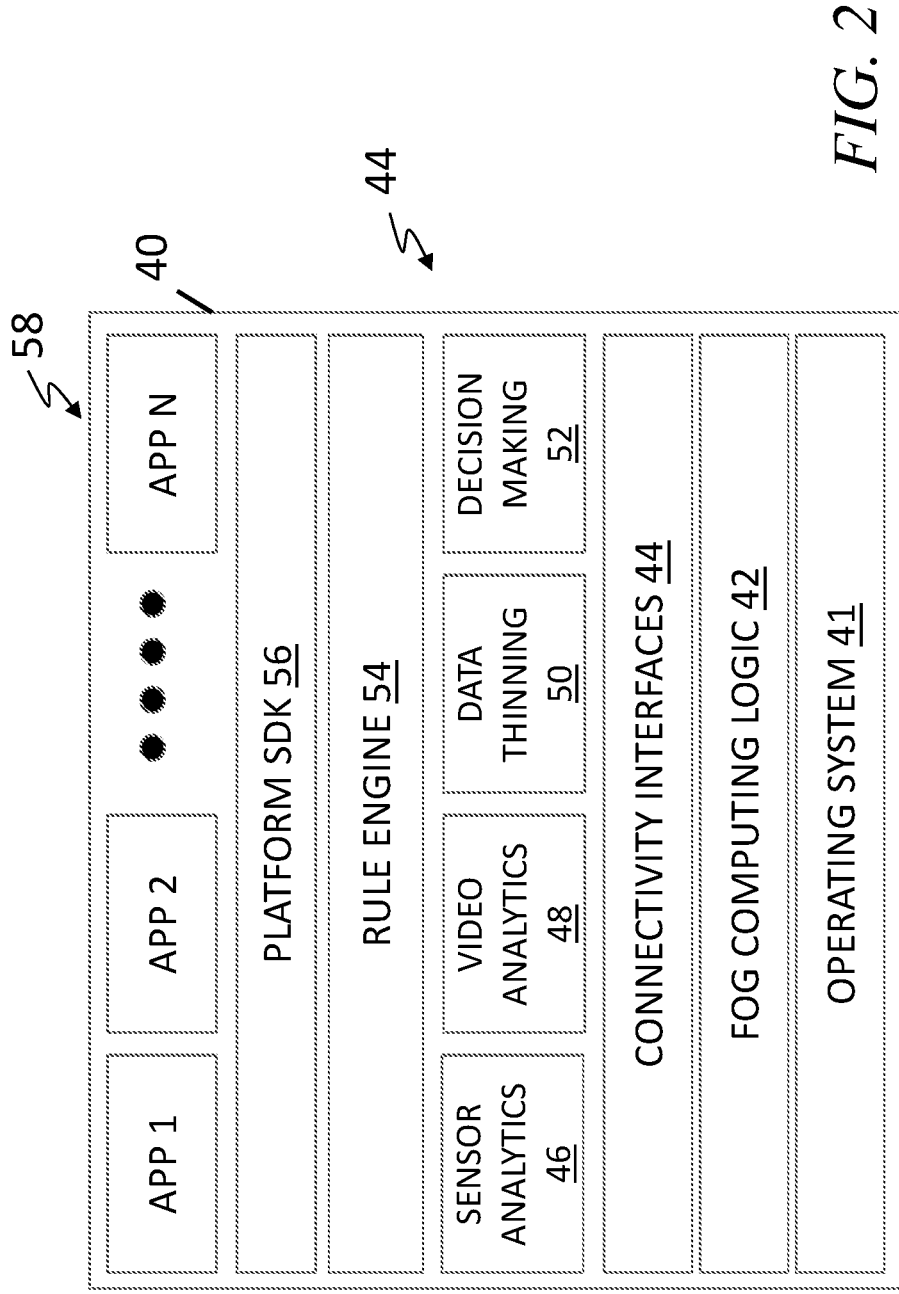
FIG. 2 is a more detailed block diagram of an exemplary intelligent fog computing platform of the intelligent multi-modal IoT gateway according to the teachings of the present disclosure.

FIG. 2 is a more detailed block diagram of an exemplary intelligent fog computing platform 40 for the intelligent multi-modal IoT gateway 10 according to the teachings of the present disclosure. In addition to the capability to connect to a variety of networks and resources, the IoT gateway 10 further possesses adequate computing power, memory, and storage capacity in addition to artificial intelligence to analyze local data to enable decision making at the local level. The intelligent fog computing platform 40 includes an operating system 41 such as Linux or another suitable operating system now known or to be developed in the future. The intelligent fog computing platform 40 also includes fog computing logic 42 that facilitates the creation of fog networks among a plurality of computing devices. This may include the operation of automatic-discovery, compute, storage, and networking services between end devices and cloud computing data centers. Further included are connectivity interfaces 44 that enable robust and boosted connectivity to a variety of networks, devices, and resources. The intelligent fog computing platform 40 further employs artificial intelligence (AI) 44 used for sensor analytics 46, video analytics 48, data thinning 50, and other decision-making logic 52, which may include a rule engine 54, decision trees, machine learning, and other AI capabilities. The rules in the rule engine may be configured dynamically using machine learning to enable the addition of new applications and new domains. These core platform capabilities: sensor analytics 46, video analytics 48, data thinning 50, and decision making 52 are described in further detail below with reference to FIGS. 3-8. The intelligent fog computing platform 40 further includes a platform SDK (software development kit) 56 that enables third party developers to leverage the intelligent IoT platform capabilities and build additional apps for a variety of domains. Supported by the intelligent fog computing platform 40 are industry domain specific applications 58 that perform a myriad of functions for a variety of applications that may be bandwidth intensive. Therefore, the intelligent fog computing software platform 40 is modular and extensible to support multiple industry domains and multiple devices, such as third-party routers.

Figure 3:
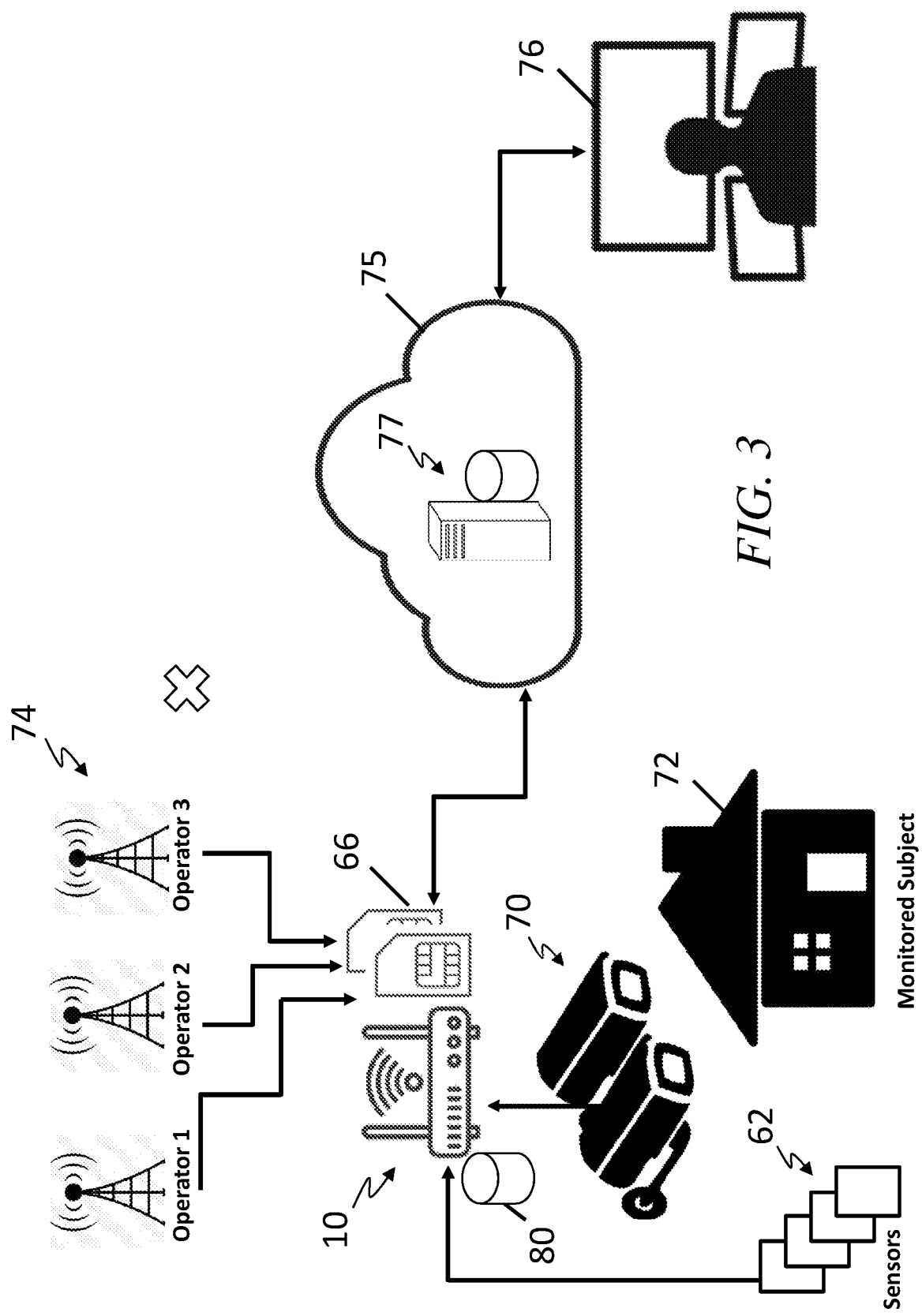
FIG. 3 is a diagram illustrating basic operations of an intelligent multi-modal IoT gateway according to the teachings of the present disclosure.

FIG. 3 is a diagram illustrating basic operations of an exemplary intelligent multi-modal IoT gateway 10 according to the teachings of the present disclosure. The intelligent multi-modal IoT gateway 10 is equipped with multiple SIM cards 66 to enable multiple simultaneous connections to the cellular network. One or more video cameras 70 and wired/wireless sensors 62 are used to monitor a subject 72 and are in wired/wireless communication with the intelligent multi-modal IoT gateway 10. If any cellular operator 74 is experiencing outages, the IoT gateway 10 is still able to identify the best available connectivity to the Internet 75 and combines them to provide reliable and boosted bandwidth to continue to live stream the video data from the video cameras 70 and sensor data from wired/wireless sensors 62 to a remote monitoring entity 76. The intelligent multi-modal IoT gateway 10 has the capability to aggregate available bandwidth resources to boost the speed to transmit data from, e.g., video cameras and sensors, to the monitoring entity 76. The intelligent multi-modal IoT gateway 10 may also be equipped with data storage capability 80 and logic to serve as a fog-based application server, such as web server, email server, media server, application server, network video recorder (NVR), and big data repository, without requiring backend connectivity all the time.

The intelligent multi-modal IoT gateway 10 further has the intelligence to automatically recognize cyber attacks such as Distributed Denial of Service (DDoS) attacks on the wireline WAN, and automatically switch communication over to the cellular network. It further has the intelligence to recognize jamming and other RF or logical tampering and automatically take action, such as generating and sending an alert to central command, sounding an alarm, or generating and sending a "message in a bottle" radio signal to signal distress.

The intelligent multi-modal IoT gateway 10 achieves data reliability and bandwidth boosting by creating a bonded Virtual Private Network (VPN) between two remote endpoints using available networks. It may define and combine multiple wired and wireless data pipes to create the bonded VPN communication, and data is split into multiple data packets and sent over these multiple data pipes simultaneously. A proxy agent manages the data traffic and utilizes each of the data pipes based on the capacity available through that pipe. Each of the data packet is labeled with a sequence number to keep track of the packets. Operating in concert with the intelligent multi-modal IoT gateway 10 is a cloud IoT gateway software component residing on a cloud server with a data storage device 77 that receives all of the data packets sent over the multiple data pipes by the intelligent multi-modal IoT gateway 10. The cloud IoT gateway software component then assembles or oversees the assembly of the data packets and stores the reconstituted data into the cloud data storage device using the sequence numbers. The cloud IoT gateway software component also enables access or streaming of the reassembled data by the remote monitoring entity 76.

The sensor and video data received by the intelligent multi-modal IoT gateway 10, depending on its nature, can be manually or programmatically categorized into critical and non-critical data. Criticality can be specified in terms of timeliness, reliability, or both. Reliability is achieved by introducing network redundancy due to the multiple data pipes, but not retransmission to ensure responsiveness, at the cost of lower bandwidth utilization. The most critical data is sent in duplicate through multiple data paths if they are available. Depending on the nature of the application, the intelligent multi-modal IoT gateway may be configured to transmit non-critical data using best effort via only one connection, or in a delay-tolerant fashion, but with guaranteed delivery. A certain level of data security can be achieved, in addition to encryption, because data are transmitted over multiple pathways, and listening on any one pathway would not yield all of the data packets.

The proxy agent also facilitates the automatic discovery of local sensors and devices by the intelligent multi-modal IoT gateway 10. The proxy agent also enables an intelligent multi-modal IoT gateway to automatically discover sensor and devices in communication with a nearby intelligent multi-modal IoT gateway. Through the proxy agent, remote computing devices can also discover and communicate with sensors and devices via the intelligent multi-modal IoT gateway 10 as if they were physically connected thereto. In this manner, an intelligent multi-modal IoT gateway can aggregate data from its own cluster of devices and sensors with data from other devices and sensors in communication with another intelligent multi-modal IoT gateway, and make decisions and take action based on an analysis of the entire collection of data.

Figure 4:
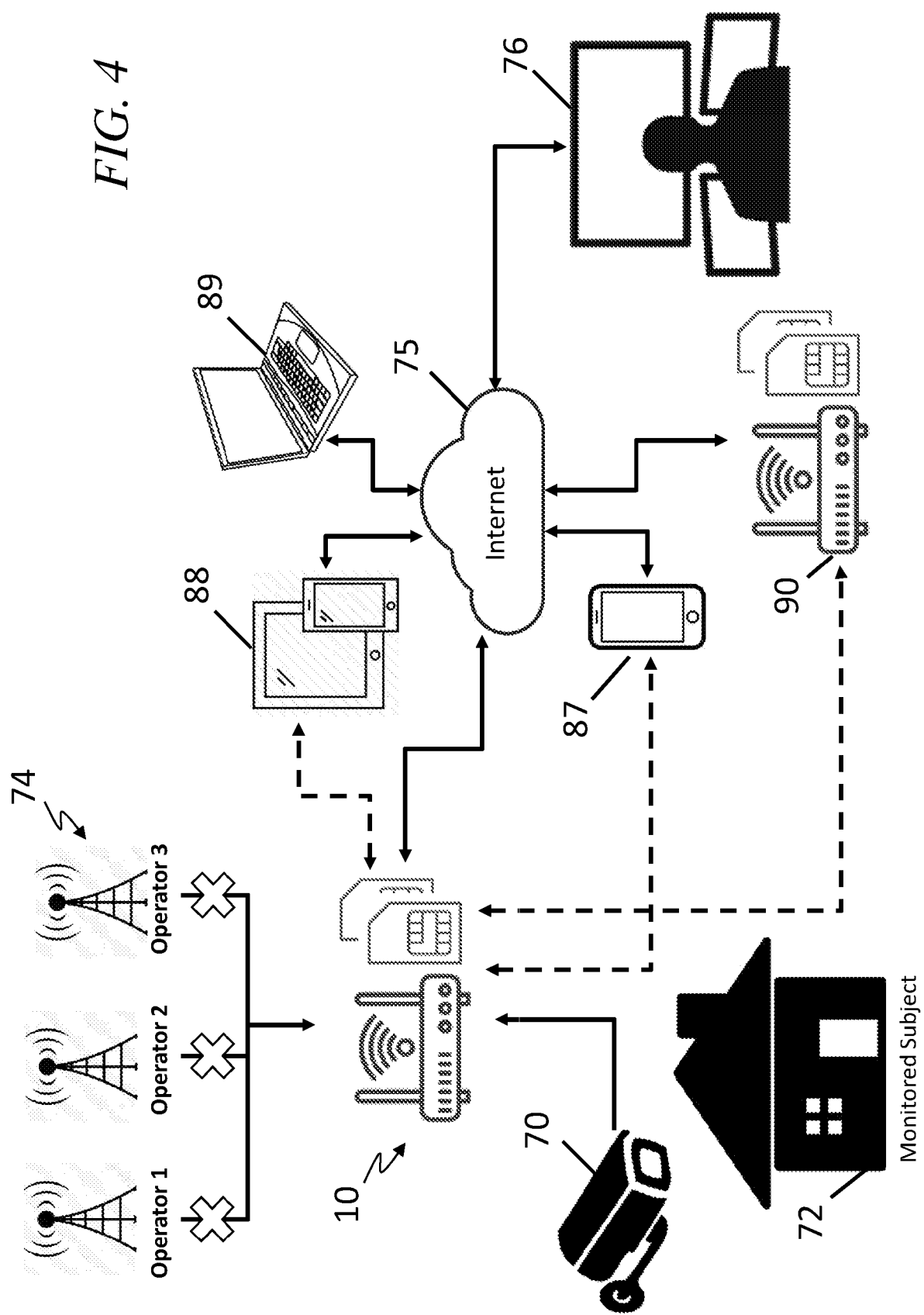
FIG. 4 is a diagram illustrating network reliability through fog networking capabilities of an intelligent multi-modal IoT gateway according to the teachings of the present disclosure.

FIG. 4 is a diagram illustrating network reliability through fog networking capabilities of an intelligent multi-modal IoT gateway 10 according to the teachings of the present disclosure. If none of the cellular networks are available, the intelligent multi-modal IoT gateway 10 automatically discovers nearby devices and intelligent multi-modal IoT gateway(s) to enable a failsafe mechanism to create a fog network using its connectivity to these other devices, such as mobile phones 87, tablet computers 88, laptops 89, and one or more IoT gateway 90 nearby. The bandwidth to continue to live-stream the video and sensor data to the monitoring entity 76 is thus sourced from the resultant fog network formed among the IoT gateways and the other computing devices.

The intelligent multi-modal IoT gateway 10 may have two operating modes: online and offline. In the offline mode the IoT gateway 10 has the ability to interact with other local devices either through a hotspot or through an ad hoc network. Using the intelligent multi-modal IoT gateway 10 in offline mode, a local user may view live video feed from one or more local video camera via direct connectivity or the fog network. In offline mode, the intelligent multi-modal IoT gateway may analyze the data to determine the best course of action, if warranted. The intelligent multi-modal IoT gateway 10 also has the ability to act as a media server, web server, an email server or an application server to provide enhanced functionality to the local user.

Figure 5:
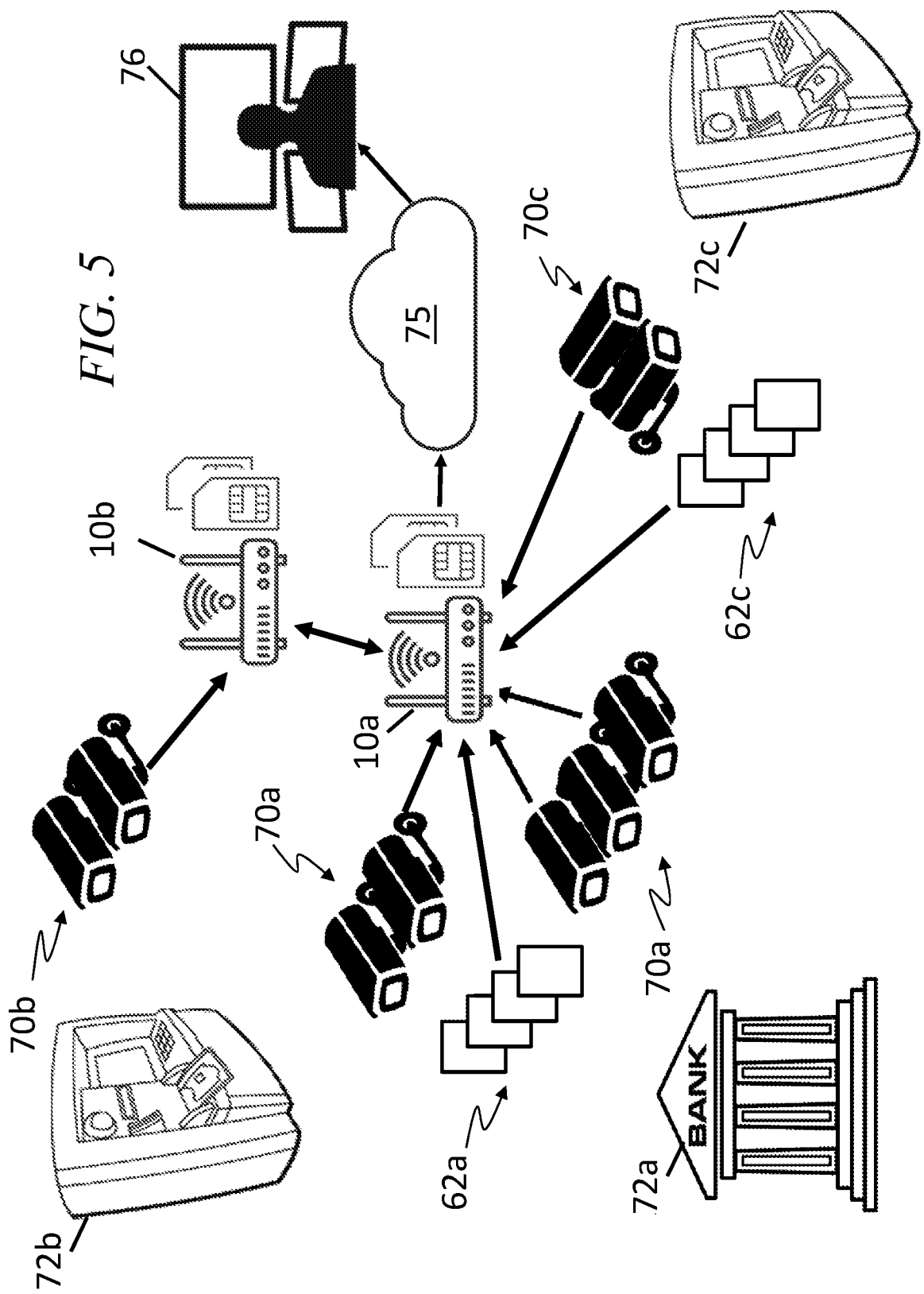
FIG. 5 is a diagram illustrating data thinning capabilities of an intelligent multi-modal IoT gateway according to the teachings of the present disclosure.

FIG. 5 is a diagram illustrating data thinning capabilities of an intelligent multi-modal IoT gateway 10a according to the teachings of the present disclosure. At any one location, such as a large facility or for security intensive application, many video cameras 70a and sensors 62a may be deployed to monitor the perimeter and interior of a banking institution 72a, for example. The many video cameras 70a and sensors 62a generate a large volume of data that are transmitted to the intelligent multi-modal IoT gateway 10a, which then relays the data via telecommunications and/or computer networks to a monitoring entity 76. Further, a second intelligent multi-modal IoT gateway 10b, temporarily lacking a connection to the Internet, may send the IoT gateway 10a data it receives from sensors and devices 70b in monitoring an ATM machine 72b, for example. Instead of retaining and sending all of the data to the monitoring entity 76, the intelligent multi-modal IoT gateways 10a and 10b employ logic and artificial intelligence to prioritize the data streams according to the type of data and the content of the data, and create a reduced data stream with only the selected or highest priority data for transmission. For example, the intelligent multi-modal IoT gateway 10a may analyze the video data from a video camera to determine if the image content has changed from time T1 to time T2. The intelligent multi-modal IoT gateway 10 may employ a rule engine that includes a rule, if <Image Content of Video Camera 1 at T2>=<Image Content of Video Camera 1 at T1>, then assign low importance to video data from T1 to T2 from Video Camera 1. Depending on the available bandwidth, data that has been identified as being of low importance may be omitted from transmission or transmitted at reduced resolution. Similar analysis may be done for sensor data. The low importance data may instead be stored locally, for example. Therefore, the amount of data reduced from the total data to be transmitted to the monitoring entity may depend on the availability of bandwidth to upload the data. In this way, intelligence at the local IoT gateway is used to selectively optimize the data so that less bandwidth is needed to transmit the data without any loss of important information.

Another data thinning example is the transmission of data to carry out a plurality of different types of financial transactions at a banking institution. An intelligent multi-modal IoT gateway may serve as its local data server but because of poor data connectivity to the Internet, the gateway may analyze the outgoing data to determine whether certain data should remain local because they are not needed to complete the transaction, for example.

Figure 6:
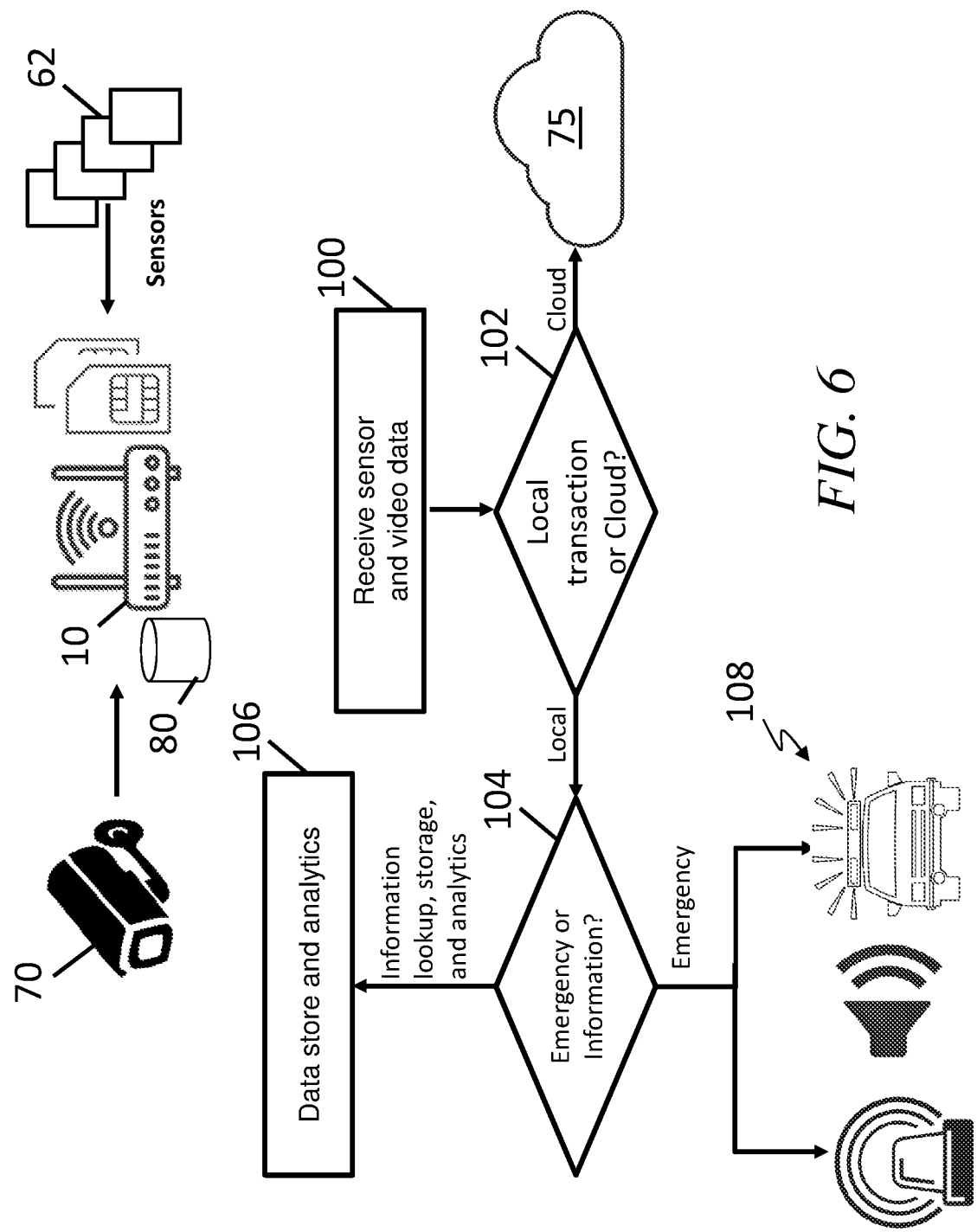
FIG. 6 is a diagram illustrating an exemplary control flow of the intelligent multi-modal IoT gateway according to the teachings of the present disclosure.

FIG. 6 is a diagram illustrating an exemplary control flow of the intelligent multi-modal IoT gateway 10 according to the teachings of the present disclosure. The intelligent multi-modal IoT gateway 10 receives sensor and video data from local video camera(s) 70 and sensor(s) 62, as shown in block 100. Logic and artificial intelligence in the IoT gateway 10 are used to analyze the data to determine whether the data should be transmitted to a remote location, such as a monitoring facility, command center, or backend office, via the Internet 75, or the data should remain local and not be transmitted, as shown in block 102. If the data is to be transmitted to the remote location, then the data are transmitted to the Internet via one or more of the connectivity and resources available to the intelligent multi-modal IoT gateway 10, after data thinning, if desired. If the data is to be retained locally, a determination is made as to whether there is an emergency, such as the occurrence of suspicious activity, as shown in block 104. If there is an emergency, as determined by image analysis and analysis of sensor data, then appropriate action is taken, such as sounding a siren, playing pre-recorded audio prompts, turning on flashing lights, or contacting law enforcement. If there is not an emergency, the data is stored locally in a database 80. Further, the data may be further analyzed locally, if desired, and the result transmitted remotely.

The intelligent multi-modal IoT gateway is also able to route data based on inputs and available video/sensor data using rule engines and decision trees in the gateway. A decision tree can be constructed based on certain input conditions, decision criteria, business rules, and decisions to be made. The decision trees may be prioritized in a manner that the higher priority decision gets executed exclusively or prior to any lower priority decision. This way, either a specific action or a range of actions are taken depending on the priority of the decision nodes. For example in the case where the monitored subject is an ATM and its surroundings, when a burglar tampers with the ATM, sensors detect this activity and transmit active signals to the intelligent multi-modal IoT gateway. Further, video camera(s) capture images of the burglar activity. Based on this active sensor data and analysis of the video data, the intelligent multi-modal IoT gateway may automatically initiate an alarm or a call to the police. The intelligent multi-modal IoT gateway may additionally transmit an alert signal to the monitoring entity, where an agent may view a live-stream of video transmitted thereto by the intelligent multi-modal IoT gateway. Two-way communication and remote control of local devices are enabled so that the agent may speak directly to the burglar via the intelligent multi-modal IoT gateway and speakers at the ATM or activate a pre-recorded message stored at the intelligent multi-modal IoT gateway. The intelligent multi-modal IoT gateway may also receive, analyze, and relay sounds and conversation at the ATM to the monitoring entity.

Figure 7:
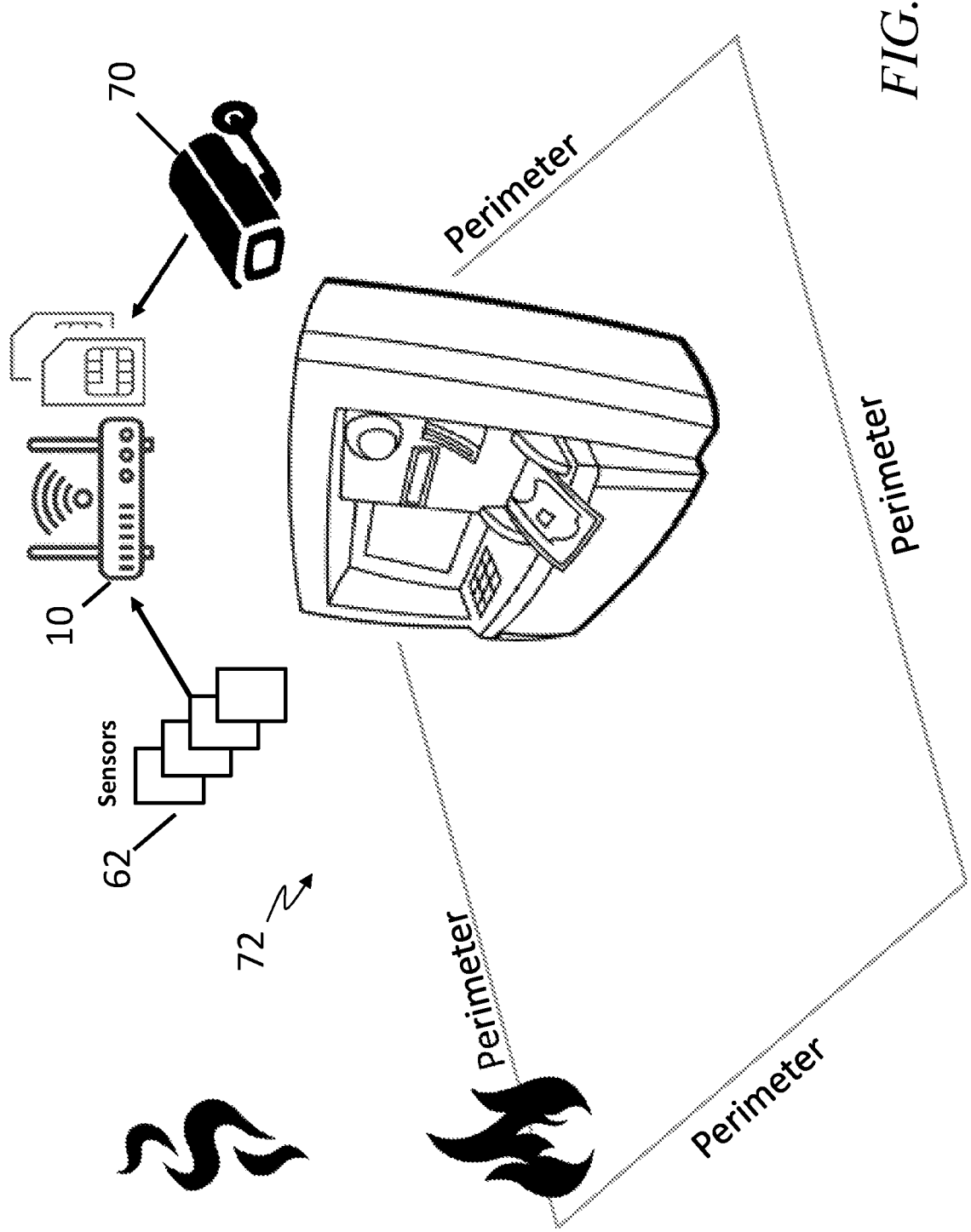
FIG. 7 is a diagram illustrating the video image analytics capabilities of an intelligent multi-modal IoT gateway according to the teachings of the present disclosure.

FIG. 7 is a diagram illustrating the video image analytics capabilities of an intelligent multi-modal IoT gateway 10 according to the teachings of the present disclosure. In this example, perimeter video camera(s) 70 and sensor(s) 62 are used to monitor an ATM site 72 and relay the video and sensor data to the local IoT gateway 10. The intelligent multi-modal IoT gateway 10 may include rules and decision trees that help to analyze the video data. For example, most people when using the ATM, stand directly in front of the machine instead of to the side. If the image data is analyzed and it is determined that a person is standing to the right or left of the ATM to avoid a video camera at the ATM, then the intelligent multi-modal IoT gateway 10 may automatically generate and transmit an alert to the monitoring entity 76. As another example, the intelligent multi-modal IoT gateway 10 may determine that the number of people in the immediate area around the ATM within a predetermined perimeter exceeds a predetermined threshold, and automatically send an alert to the monitoring entity 76. In another example, the intelligent multi-modal IoT gateway 10 may analyze audio data and identify statements that are associated with terrorist acts, and immediately and automatically generates and transmits an alert to the monitoring entity 76 and law enforcement. The intelligent multi-modal IoT gateway 10 may even be able to detect trash, a person, or unidentified object on the floor around the ATM, and automatically transmits an alert to a supervisor to take appropriate actions. Further, sensors that may detect the presence of smoke or fire may send active signals to the intelligent multi-modal IoT gateway 10, which may then automatically contact the monitoring entity 76, fire department, and law enforcement.

The video analysis performed by the intelligent multi-modal IoT gateway 10 may additionally include facial recognition and comparison to known criminals in a local or remote database, and/or recognition of certain objects on a person's face, such as a mask or a scarf or bandana. In another example where the monitored subject 72 is the premises of a fast food restaurant, the video analysis may include identifying how many patrons are in the restaurant at any time, whether the counter employees wore the required headwear and uniform, and actively monitor the activities in the dining room. For example, the intelligent multi-modal IoT gateway may automatically recognize unusual or alarming activity, such as people fighting, armed robbery, vandalism, etc. in the restaurant and automatically generate an alert signal to be transmitted to the monitoring entity 76 and law enforcement where appropriate.

Figure 8:
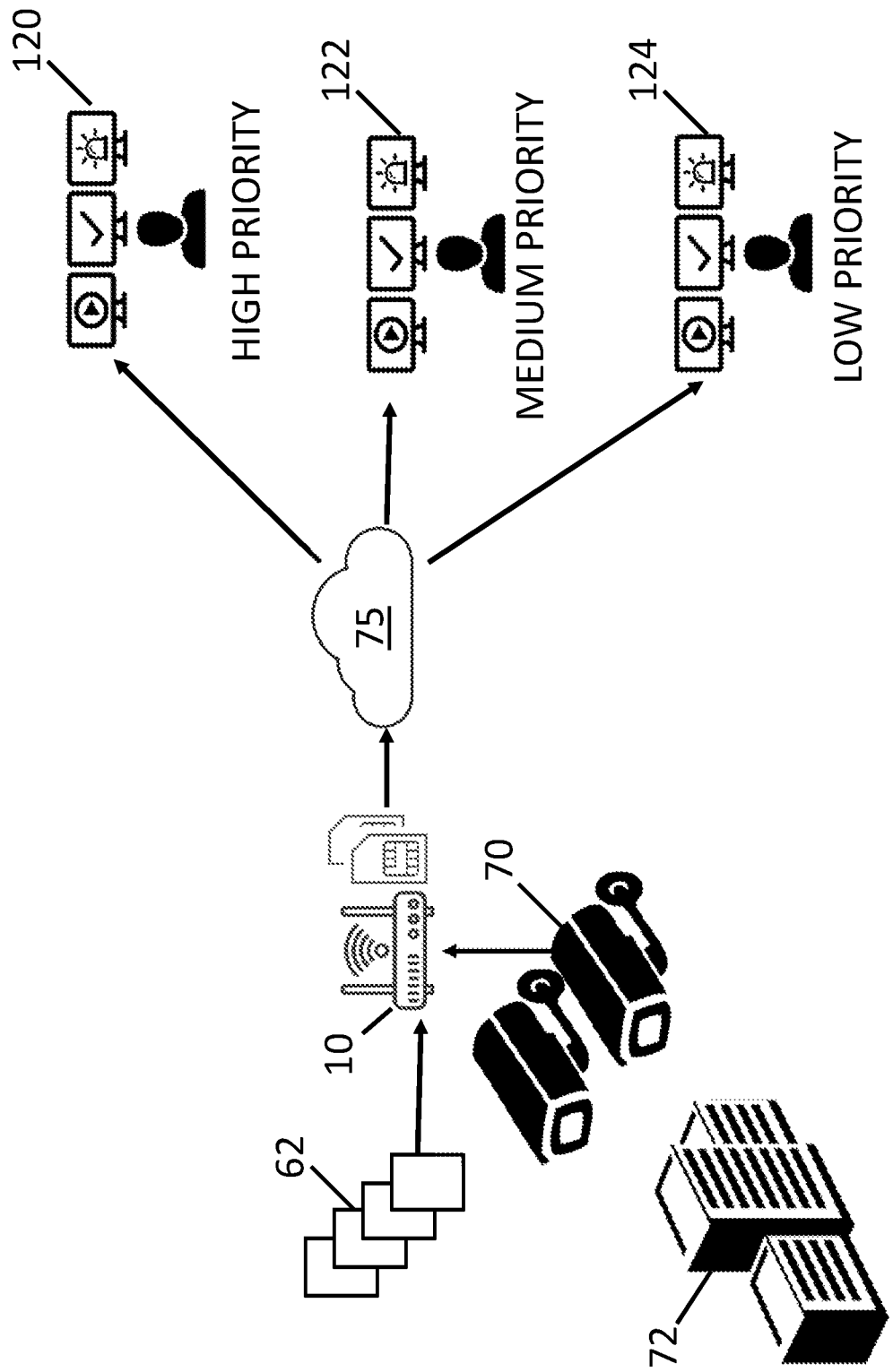
FIG. 8 is a diagram illustrating intelligent data routing and workflow capabilities of an intelligent multi-modal IoT gateway according to the teachings of the present disclosure.

FIG. 8 is a diagram illustrating intelligent data routing and workflow capabilities of an intelligent multi-modal IoT gateway 10 according to the teachings of the present disclosure. The intelligent multi-modal IoT gateway 10 receives video images from the video cameras 70 and automatically performs analytics and decision making in response to the analysis of the images. Based on the recognition of monitored site status and activities, an assignment of priority can be made to the received sensor and video data, and the video/sensor data and the alert generated can be prioritized accordingly. For example, a burglary, vandalism, and fire at the site may warrant a high priority recognition and the associated video/sensor data and alert signal are transmitted to a high priority monitoring station 120 at the monitoring facility. An argument between two people may be assigned medium priority and the associated video/sensor data and alert signal are transmitted to a medium priority monitoring station 122. Trash on the floor may be assigned low priority and the associated video/sensor data are transmitted to a low priority monitoring station 124. At the monitoring facility, the high priority monitoring stations are staffed by personnel with the most experience, training, and skill level, whereas the low priority monitoring stations can be staffed by personnel with the least experience, training, and skill level. In this way, monitoring centers may utilize personnel efficiently and the workflow can be organized intelligently to reduce costs.

Figure 9:
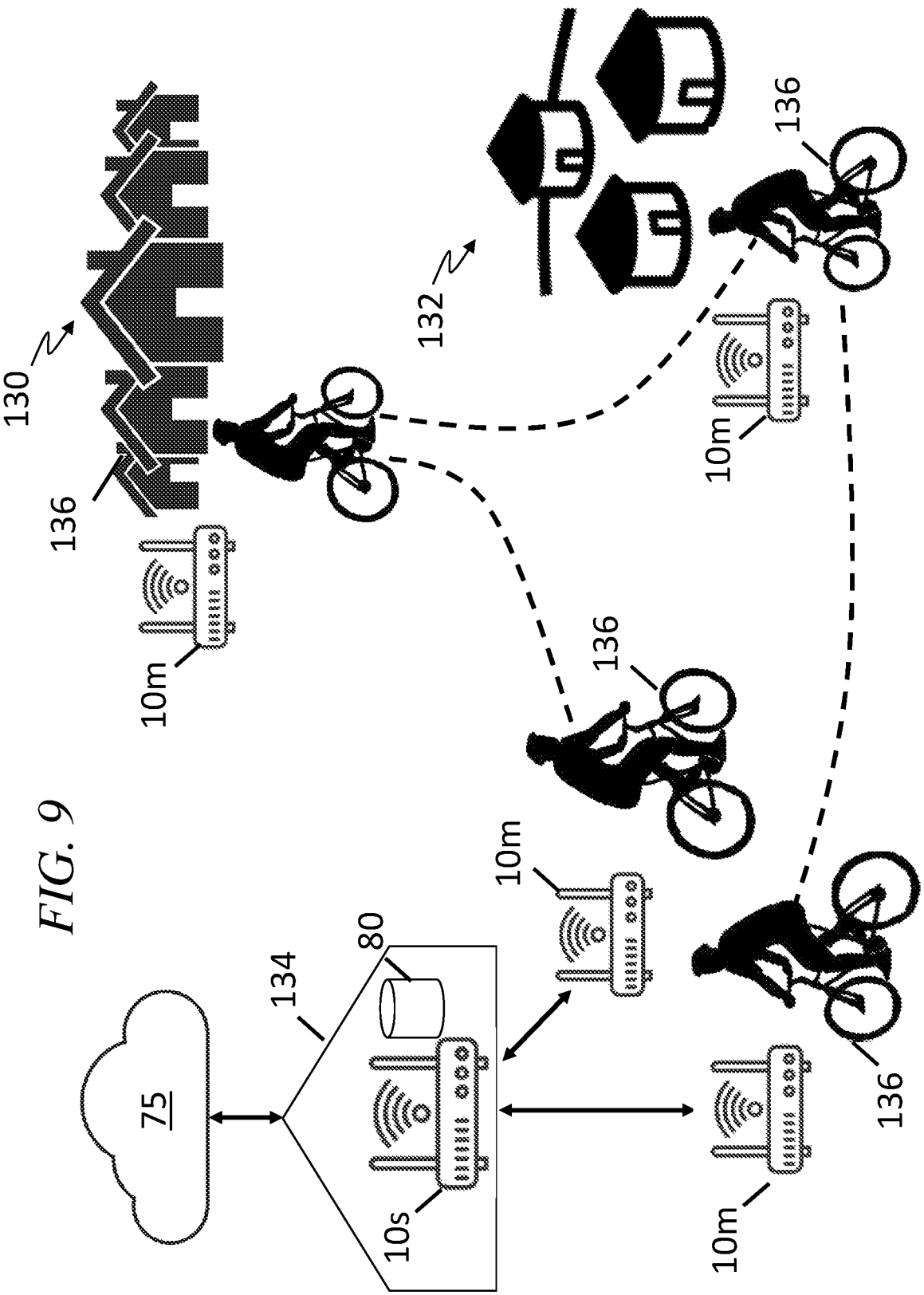
FIG. 9 is a diagram illustrating delay tolerant fog computing capabilities of an intelligent multi-modal IoT gateway according to the teachings of the present disclosure.

FIG. 9 is a diagram illustrating delay-tolerant fog computing capabilities of an intelligent multi-modal IoT gateway 10 according to the teachings of the present disclosure. In this use case, remote villages 130 and 132 do not have Internet connectivity, but the villages' residents are serviced by a post office 134 with daily mail delivered by a mail carrier 136. A stationary intelligent multi-modal IoT gateway 10s is installed at the post office 134 that has connectivity to the Internet 75 via one or more networks, devices, and resources. On a daily basis (or another time interval), email addressed to residents of the villages are downloaded to a data storage device or database 80 accessible by the IoT gateway 10s. These incoming emails are then transmitted to a mobile intelligent multi-modal IoT gateway 10m that is carried or transported to each village 130 and 132 by the mail carrier 136. The mobile IoT gateway 10m may be powered by a power source such as a rechargeable battery while in transit. When the mail carrier 136 arrives at a village to deliver mail and pickup outgoing mail, the mobile intelligent multi-modal IoT gateway 10m automatically forms a fog network with the computing devices (mobile phones, tablet computers, laptop computers, etc.) at the village, and the incoming emails are delivered to the appropriate computing devices according to the recipient addresses. Similarly, outgoing emails from the villagers are collected by the mobile intelligent multi-modal IoT gateway 10m from the computing devices. Therefore, email exchanges between the mobile intelligent multi-modal IoT gateway 10m and the local computing devices occur as the mail carrier arrives at each village. After the mail carrier 136 has completed making the daily round to the villages, he returns to the post office 134 and the mobile intelligent multi-modal IoT gateway 10m forms a fog network with the stationary intelligent multi-modal IoT gateway 10s and uploads the collected outgoing emails to the Internet 75 via the stationary intelligent multi-modal IoT gateway 10s. In this manner, remote locations without Internet connectivity can still have a somewhat regular electronic communication with the outside world and exchange email and other forms of communication.

Conventional routers do not possess artificial intelligence to make local decisions without Internet connectivity, and there is typically no ability to communicate to a universal set of devices over a variety of connections. The intelligent multi-modal IoT gateway 10 provides the ability to universally connect to a range of devices and make intelligent decisions in a fog network with or without Internet connectivity. The intelligent multi-modal IoT gateway 10 has the ability to provide a reliable wide area network (WAN) connection to the fog nodes in the IoT-hub centered fog network using wired broadband, cellular, RF and any other connection technology while increasing the total bandwidth of the connection, for upstream and downstream traffic, and by aggregating all available bandwidths while providing instantaneous fail over mechanism as long as there is one working data pipe available. Even if there were no connection available, the intelligent multi-modal IoT gateway is still able to process and analyze the data locally to the extent possible, operating in a "delay tolerant mode," until data communication becomes feasible again. Further, the intelligent multi-modal IoT gateway is able to connect with another intelligent multi-modal IoT gateway or device (such as a smartphone) that has connectivity, and covey data via this alternate pathway.

Accordingly, the intelligent multi-modal IoT gateway 10 may find application in the following application domains: network reliability and bandwidth enhancement, security applications using sensor input and automated response, network reliability through fog network, delay tolerant fog computing, reliable video surveillance, and intelligent threat detection. Local data analytics enable data thinning, ensuring that network resources are used optimally and cloud resources are not burdened unnecessarily. This intelligent workflow mechanism ensures that only video streams needing monitoring and action are directed to the cloud, optimizing the monitoring facility's human and capital resources.

It should be noted that wired/wireless sensors 62 may include a myriad of devices that are capable of measuring and/or detecting many different types of parameters, such as motion, sound, light intensity, temperature, liquid level, humidity, pressure, barometric, infrared, smoke, carbon monoxide, photon-beams, ultrasound, shock, and other types of sensors now known or to be developed in the future. It should be noted that the intelligent multi-modal IoT gateway is also referred to as the intelligent multi-modal IoT gateway and the IoT gateway herein.

The features of the present invention which are believed to be novel are set forth below with particularity in the appended claims. However, modifications, variations, and changes to the exemplary embodiments described above will be apparent to those skilled in the art, and the novel intelligent multi-modal IoT gateway and other concepts described herein thus encompasses such modifications, variations, and changes and are not limited to the specific embodiments described herein.

What is claimed is:

1. An intelligent multi-modal gateway comprising:
   at least one wireless RF communication interface configured to couple to at least two local devices via the wireless RF communication interface;
   at least one cellular communication interface configured to communicate data via at least one cellular communication channel;
   at least one wireline communication interface;
   connectivity logic configured to provide connection between a remote device and at least one of the two local devices via at least one of the wireless, cellular, and wireline communication interfaces to ensure fail-safe connectivity and reliability;
   fog networking logic configured to form a fog network with the at least two local devices for transmitting data therewith;
   bandwidth aggregation logic configured to aggregate available bandwidth from the fog network comprising available bandwidth of the at least two local devices and the wireless, cellular, and wireline communication interfaces to ensure adequate bandwidth for data transmission between the remote device and the at least one local device; and
   artificial intelligence logic configured to analyze data received from the at least one local device via the wireless, cellular, and wireline communication interfaces, and take appropriate action in response to the analysis including forming the fog network and aggregating bandwidth of available communication channels of the at least two local devices and the wireless, cellular, and wireline communication channels.

2. The intelligent multi-modal gateway of claim 1, wherein the connectivity logic is further configured to create a fog network in response to failure detected in an active cellular communication interface by using connectivity with at least one nearby device via at least one of the wireless and wireline communication interfaces that have network connectivity.

3. The intelligent multi-modal gateway of claim 1, further comprising a plurality of cellular communication interfaces, and wherein the connectivity logic is further configured to connect to a cellular network via another cellular communication interface in response to failure detected in an active cellular communication interface to maintain reliable data connectivity.

4. The intelligent multi-modal gateway of claim 1, wherein the at least one local device comprises a video camera transmitting video data to the gateway, and the gateway further comprises video analysis logic configured to apply the artificial intelligence logic to analyze the content of the video data.

5. The intelligent multi-modal gateway of claim 4, wherein the at least one local device comprises a plurality of video cameras transmitting video data to the gateway, and the gateway further comprises data thinning logic configured to apply the artificial intelligence logic to analyze the content of the video data, and reduce amount of video data to be transmitted to the remote device.

6. The intelligent multi-modal gateway of claim 1, wherein the at least one local device comprises a sensor transmitting sensor data to the gateway, and the gateway further comprises sensor analysis logic configured to apply the artificial intelligence logic to analyze the content of the sensor data.

7. The intelligent multi-modal gateway of claim 1, wherein the at least one local device comprises a plurality of video cameras transmitting video data to the gateway, and the gateway further comprises video analysis logic configured to apply the artificial intelligence logic to analyze the content of the video data, and automatically generate and transmit an alert signal to one of a remote monitoring center and law enforcement agency in response to a detected emergency.

8. The intelligent multi-modal gateway of claim 1, wherein the at least one local device comprises at least one video camera and sensor transmitting video and sensor data to the gateway, and the gateway further comprising workflow optimization logic configured to apply the artificial intelligence logic to analyze the content of the video and sensor data, automatically recognize criticality level of the video and sensor data, and automatically route the video and sensor data to a remote device consistent with the criticality level of the video and sensor data.

9. The intelligent multi-modal gateway of claim 1, wherein the gateway further comprises data thinning logic configured to apply the artificial intelligence logic to analyze the content of the data received from the at least one local device, and reduce amount of data to be transmitted to the remote device.

10. The intelligent multi-modal gateway of claim 1, further comprising a data storage device configured to store data received by the intelligent gateway for later transmission over available connection to the remote device.

11. The intelligent multi-modal gateway of claim 1, wherein the fog networking logic is further configured to automatically discover the at least one local device.

12. The intelligent multi-modal gateway of claim 1, wherein the fog networking logic is further configured to enable the remote device to automatically discover the at least one local device.

13. The intelligent multi-modal gateway of claim 1, wherein the artificial intelligence logic is further configured to detect a hostile attack in the form of one of a cyber-attack and RF jamming, and take action in response thereto.

14. A fog network gateway comprising:
   a plurality of different types of data communication interfaces;
   connectivity logic configured to provide connection between a remote device and a plurality of local devices via at least one of the plurality of different types of data communication interfaces to ensure fail-safe connectivity and reliability therebetween;

fog networking logic configured to form a fog network with the plurality of local devices for communicating data;

bandwidth aggregation logic configured to aggregate available bandwidth from the plurality of local devices in the fog network and different types of communication interfaces to ensure adequate bandwidth for data transmission between the remote device and the plurality of local devices; and artificial intelligence logic configured to automatically analyze data received from the plurality of local devices via the plurality of different types of data communication interfaces, and automatically transmit a selected subset of data to the remote device via aggregated bandwidth in the fog network in response to a determination of criticality level of the received data in available of bandwidth by the artificial intelligence logic.

15. The fog network gateway of claim 14, wherein the plurality of different types of data communication interfaces comprises at least one cellular communication interface, and the connectivity logic is further configured to create a fog network in response to failure detected in the at least one cellular communication interface by using connectivity with at least one nearby device via at least one of the wireless and wireline communication interfaces that have network connectivity.

16. The fog network gateway of claim 14, wherein the plurality of different types of data communication interfaces comprises a plurality of cellular communication interfaces, and wherein the connectivity logic is further configured to connect to a cellular network via another cellular communication interface in response to failure detected in an active cellular communication interface to maintain reliable data connectivity.

17. The fog network gateway of claim 14, wherein the plurality of local devices comprise video cameras transmitting video data to the gateway, and the gateway further comprises video analysis logic configured to apply the artificial intelligence logic to analyze the content of the video data.

18. The fog network gateway of claim 17, wherein the plurality of devices comprise a plurality of video cameras transmitting video data to the gateway, and the gateway further comprises data thinning logic configured to apply the artificial intelligence logic to analyze the content of the video data, and reduce amount of video data to be transmitted to the remote device.

19. The fog network gateway of claim 14, wherein the plurality of local devices comprise the plurality of sensors transmitting sensor data to the gateway, and the gateway further comprises sensor analysis logic configured to apply the artificial intelligence logic to analyze the content of the sensor data.

20. The fog network gateway of claim 14, wherein the plurality of local devices comprise a plurality of video cameras transmitting video data to the gateway, and the gateway further comprises video analysis logic configured to apply the artificial intelligence logic to analyze the content of the video data, and automatically generate and transmit an alert signal to one of a remote monitoring center and law enforcement agency in response to a detected emergency.

21. The fog network gateway of claim 14, wherein the plurality of local devices comprise a plurality of video cameras and sensors transmitting video and sensor data to the gateway, and the gateway further comprising workflow optimization logic configured to apply the artificial intelligence logic to analyze the content of the video and sensor data, automatically recognize criticality level of the video and sensor data, and automatically route the video and sensor data to a remote device consistent with the criticality level of the video and sensor data.

22. The fog network gateway of claim 14, further comprising a data storage device configured to store data received from the plurality of local devices by the fog network gateway for delayed transmission to the remote device.

23. A method for robust data connectivity, comprising:
forming a fog network among a first plurality of local devices at least a subset thereof having Internet connectivity;
receiving data from a second plurality of local devices;
analyzing the received data to determine criticality level of the received data, and selecting a subset of the received data in response to the determined criticality level of the received data;
aggregating available data bandwidth from at least two local devices having Internet connectivity; and
transmitting the selected subset of the received data to one of a plurality of remote devices via the fog network in response to the determined criticality level of the received data.

24. The method of claim 23, further comprising connecting to the Internet via one of at least two cellular communication interfaces.

25. The method of claim 23, wherein the second plurality of local devices comprise at least one of a video camera and a sensor.

* * * * *